US008305637B2

(12) United States Patent
Shinohara

(10) Patent No.: US 8,305,637 B2

(45) Date of Patent: Nov. 6, 2012

(54) IMAGE FORMING APPARATUS, POSITIONAL DEVIATION CORRECTION METHOD, AND RECORDING MEDIUM STORING POSITIONAL DEVIATION CORRECTION PROGRAM

(75) Inventor: Tadashi Shinohara, Yokohama (JP)

(73) Assignee: Ricoh Company, Limited, Tokyo (JP)

( * ) Notice: Subject to any disclaimer, the term of this patent is extended or adjusted under 35 U.S.C. 154(b) by 882 days.

(21) Appl. No.: 12/392,437

(22) Filed: Feb. 25, 2009

(65) Prior Publication Data

US 2009/0237695 A1 Sep. 24, 2009

(30) Foreign Application Priority Data

Mar. 18, 2008 (JP) ................................ 2008-069285

(51) Int. Cl.
*H04N 1/60* (2006.01)

(52) U.S. Cl. .......... 358/1.9; 358/1.18; 358/518; 347/19; 347/103; 347/116; 347/232; 347/248; 399/301; 359/204.1; 359/212.1; 359/216.1; 359/301

(58) Field of Classification Search ........................ None
See application file for complete search history.

(56) References Cited

U.S. PATENT DOCUMENTS 5,844,591 A * 12/1998 Takamatsu et al. ........... 347/235
6,282,396 B1 * 8/2001 Iwata et al. ................... 399/301
6,342,963 B1 * 1/2002 Yoshino ..................... 359/204.1
6,573,918 B2 6/2003 Shinohara et al.
6,587,137 B2 7/2003 Shinohara et al.
6,704,035 B2 * 3/2004 Kobayashi et al. ........... 347/116
6,714,224 B2 3/2004 Yamanaka et al.
6,829,465 B2 12/2004 Yamanaka et al.
6,903,759 B2 6/2005 Yamanaka et al.
6,906,832 B2 * 6/2005 Furukawa et al. ............ 358/480
6,999,708 B2 * 2/2006 Maeda .......................... 399/301
7,313,352 B2 * 12/2007 Shinohara et al. ............ 399/301
7,360,886 B2 * 4/2008 Kitao ............................ 347/103
7,376,363 B2 5/2008 Yamanaka et al.

(Continued)

FOREIGN PATENT DOCUMENTS

JP 2002-160399 A 6/2002

(Continued)

OTHER PUBLICATIONS

Japanese Office Action mailed on Jul. 24, 2012, issued for JP Application No. 2008-069285, filed on Mar. 18, 2008.

*Primary Examiner* — Dung Tran

(74) *Attorney, Agent, or Firm* — Oblon, Spivak, McClelland, Maier & Neustadt, L.L.P.

(57) ABSTRACT

A multicolor image forming apparatus includes an exposure unit to direct optical beams for optically writing different single-color images on image carriers, respectively, a pattern forming unit to form a positioning pattern on a transport member, a pattern detector to detect the positioning pattern, disposed above the transport member, a positional data detector disposed on a scanning line to detect positional data in a sub-scanning direction of the optical beams, an adjustment unit, and a storage unit. The adjustment unit detects positional deviations among the different single-color images based on detection results generated by both the pattern detector and the positional data detector, respectively, and then corrects the positional deviations. The storage unit stores as reference data the positional data in the sub-scanning direction of the optical beams detected when the positional deviations are corrected.

15 Claims, 10 Drawing Sheets

U.S. PATENT DOCUMENTS

| | | | | |
|---|---|---|---|---|
| 7,415,231 | B2 * | 8/2008 | Maeda | 399/301 |
| 7,576,764 | B2 * | 8/2009 | Shinohara | 347/235 |
| 7,697,184 | B2 * | 4/2010 | Sakaue et al. | 359/212.1 |
| 7,715,768 | B2 * | 5/2010 | Shinohara | 399/301 |
| 7,770,998 | B2 * | 8/2010 | Shinohara et al. | 347/19 |
| 7,956,882 | B2 * | 6/2011 | Nakajima | 347/234 |
| 8,014,041 | B2 * | 9/2011 | Suzuki et al. | 358/474 |
| 2004/0100550 | A1 * | 5/2004 | Bannai et al. | 347/232 |
| 2004/0239747 | A1 * | 12/2004 | Maeda | 347/116 |
| 2005/0195235 | A1 * | 9/2005 | Kitao | 347/19 |
| 2005/0206980 | A1 * | 9/2005 | Nishikawa et al. | 358/518 |
| 2006/0045577 | A1 * | 3/2006 | Maeda | 399/301 |
| 2006/0139433 | A1 * | 6/2006 | Yoshida | 347/116 |
| 2007/0025779 | A1 * | 2/2007 | Shinohara | 399/301 |
| 2007/0097202 | A1 * | 5/2007 | Shinohara | 347/248 |
| 2007/0121175 | A1 * | 5/2007 | Futami | 358/474 |
| 2007/0140721 | A1 | 6/2007 | Shinohara et al. | |
| 2008/0024851 | A1 * | 1/2008 | Sakaue et al. | 359/216 |

FOREIGN PATENT DOCUMENTS

| | | | |
|---|---|---|---|
| JP | 2004-58404 | | 2/2004 |
| JP | 2005-37575 | | 2/2005 |
| JP | 2005-091927 | A | 4/2005 |
| JP | 2006-035623 | A | 2/2006 |
| JP | 2006-137133 | A | 6/2006 |
| JP | 2006-259445 | A | 9/2006 |
| JP | 2007-144667 | A | 6/2007 |
| JP | 2007-212938 | A | 8/2007 |

* cited by examiner

IMAGE FORMING APPARATUS, POSITIONAL DEVIATION CORRECTION METHOD, AND RECORDING MEDIUM STORING POSITIONAL DEVIATION CORRECTION PROGRAM

CROSS-REFERENCE TO RELATED APPLICATIONS

This patent specification is based on and claims priority from Japanese Patent Application No. 2008-069285, filed on Mar. 18, 2008 in the Japan Patent Office, the entire contents of which are hereby incorporated by reference herein.

BACKGROUND OF THE INVENTION

1. Field of the Invention

The present invention generally relates to a multicolor image forming apparatus such as a copier, a printer, a facsimile machine, and a multifunction machine including at least two of those functions, a positional deviation correction method therefor, and a recording medium storing a positional deviation correction program.

2. Discussion of the Background Art

In general, an electrophotographic image forming apparatus, such as a copier, a printer, a facsimile machine, a multifunction machine including at least two of those functions, etc., includes an optical writing unit or exposure unit that writes image information optically on a surface of an image carrier such as a photoreceptor using an optical beam such as laser light.

As such an electrophotographic image forming apparatus, a tandem type multicolor image forming apparatus including multiple image carriers is widely used. In the tandem type multicolor image forming apparatus, different single-color images are formed on the multiple image carriers, respectively. Then, the single-color images are transferred from the image carriers and superimposed one on another on a sheet of recording media, such as a transfer sheet, that is transported by a transport member such as a transport belt in a direct transfer method, forming a multicolor image.

By contrast, in an intermediate transfer method, the single-color images are primarily superimposed one on another on an intermediate transport member as a multicolor image and then the multicolor image is transferred onto the sheet. In this case, the intermediate transport member serves as the transport member for transporting the multicolor image as well.

When multiple single-color images are thus superimposed one on another, relative positions thereof on the sheet can deviate. That is, the different color images may not be properly aligned, that is, may not perfectly coincide, in the multicolor image, a phenomenon that is hereinafter referred to as color deviation.

Therefore, positioning of the images is important to avoid color deviation, and accordingly it is necessary to adjust positions, distances traveled, and/or velocities of movable elements such as the image carrier, the transport belt, and the like.

In order to adjust the position of the transport belt or the intermediate transfer member, in a known image forming apparatus a positioning mark is provided on the transport member, and positional deviation thereof is corrected based on results obtained by detecting the positioning mark.

Moreover, in such an image forming apparatus, start and end of optical writing, that is, exposure timing, should be controlled. In particular, in the tandem image forming apparatus, if start positions of the respective optical beams on the multiple image carriers are mismatched, relative positions of the multiple single-color images will be misaligned, causing color deviation.

The start and end of optical writing can be detected by first and second optical beam detectors respectively disposed at two different positions on a main scanning line, and measuring time periods for the optical beam to travel between these optical beam detectors by counting a predetermined or given clock signal. Then, the counted clock number is compared with a predetermined reference clock number to calculate an amount by which the end of the optical writing is to be adjusted, and thus magnification of the image that is optically written on the image carrier can be adjusted.

In order to control the exposure timing, a known optical writing unit includes a light source, a deflector that deflects and scans a laser beam emitted from the light source in the main scanning direction, an imaging unit that focuses the optical beam on the surface of the image carrier, and multiple laser beam detectors arranged in the main scanning direction that detect a position of the laser beam. Each laser beam detector includes multiple light-receiving surfaces, and at least two of the multiple light-receiving surfaces are adjacent to each other at a given angle.

Another known optical writing unit includes a deflector that deflects an optical beam that is modulated according to an image signal in a main scanning direction, multiple optical beam detectors that detect the deflected optical beam at two different positions on an identical main scanning line outside an image forming area, a measurement unit that measures a time period required for the optical beam to travel between the multiple optical beam detectors by counting a predetermined or given clock signal, and a determination unit that determines whether or not a normal signal is output at a timing at which the optical beam is expected to enter each of the multiple optical beam detectors.

Because it takes a relatively long time to adjust the position of the transport belt or the intermediate transfer member based on the results obtained by detecting the positioning mark, instead, the positions of the images are adjusted by adjusting the exposure timing using the optical beam detectors.

However, positions of the beam detectors can change, affected by a rise in temperature inside the optical writing unit. In such a case, accurate positional detection cannot be obtained.

SUMMARY OF THE INVENTION

In view of the foregoing, one illustrative embodiment of the present invention provides a multicolor image forming apparatus that forms a multicolor image on a sheet of recording media by superimposing different single-color images one on another. The multicolor image forming apparatus includes an exposure unit to direct optical beams for optically writing the different single-color images on respective image carriers, a pattern forming unit to form a positioning pattern on a transport member, a pattern detector disposed above the transport member, to detect the positioning pattern, a positional data detector disposed on a scanning line to detect positional data in a sub-scanning direction of the optical beams, an adjustment unit, and a storage unit. The adjustment unit detects positional deviations among the different single-color images based on detection results generated by one of the pattern detector and the positional data detector and then corrects the positional deviations. The storage unit stores as reference data the positional data in the sub-scanning direction of the optical beams that are detected when the positional deviations are corrected.

Another illustrative embodiment of the present invention provides a positional deviation correction method for the multicolor image forming apparatus described above. The positional deviation correction method includes storing as reference data positional data in the sub-scanning direction of optical beams for optically writing the single-color images on respective image carriers that are detected when positions of the different single-color images are adjusted, detecting current positional data in the sub-scanning direction of the optical beam, detecting positional deviations among the different single-color images based on the detected current positional data in the sub-scanning direction of the optical beams and the stored reference data, and correcting the positional deviations by adjusting writing positions of the optical beams on the image carriers.

Yet another illustrative embodiment of the present invention provides a computer-readable recording medium storing a positional deviation correction program for executing the positional deviation correction method described above.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
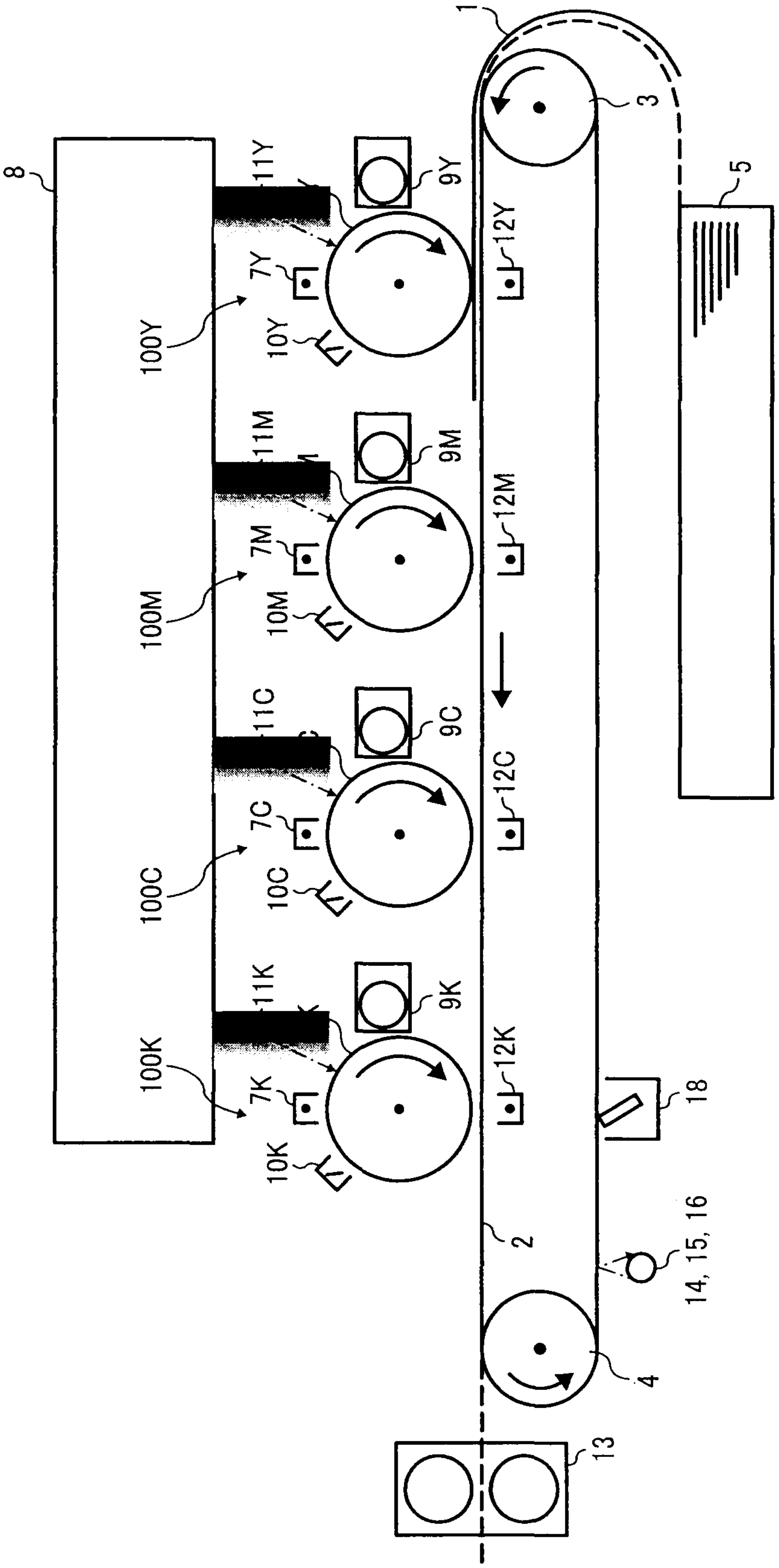
FIG. 1 is a schematic diagram illustrating a configuration of a multicolor image forming apparatus according to an illustrative embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, and particularly to FIG. 1, a multicolor image forming apparatus according to an illustrative embodiment of the present invention is described.

FIG. 1 illustrates a direct transfer type tandem image forming apparatus that transfers single-color images formed by multiple image forming units directly onto a recording medium such as a sheet of paper, an OHP (Overhead Projector) sheet, and the like, forming a multicolor image thereon.

As shown in FIG. 1, the image forming apparatus includes image forming units 100Y, 100M, 100C, and 100K, serving as a pattern forming unit, disposed along a transport belt 2 that serves as a transport member to transports a transfer sheet 1 (recording medium), a sheet tray 5 disposed beneath the transport belt 2, an exposure unit 8 disposed above the image forming units 100Y, 100M, 100C, and 100K, transfer units 12Y, 12M, 12C, and 12K, a fixer 13, sensors 14 through 16 serving as pattern detectors, and a cleaning unit 18.

It is to be noted that the reference characters K, Y, M, and C represent black, yellow, magenta, and cyan, respectively, and may be omitted in the description below when color discrimination is not necessary.

The image forming units 100Y, 100M, 100C, and 100K respectively form different single-color images, that is, yellow, magenta, cyan, and black images. The transport belt 2 is wound around transport rollers 3 and 4 in a tensioned state and rotated by rotation thereof in a direction indicated by an arrow shown in FIG. 1. This direction is also referred to as a sheet transport direction. One of the transport rollers 3 and 4 serves as a driving roller and the other serves as a driven roller. The sheet tray 5 contains multiple transfer sheets 1, and the transfer sheets 1 are fed one by one from the top during image formation. The transfer sheet 1 is attracted to the transport belt 2 electrostatically and is initially transported to the image forming unit 100Y in the present embodiment.

Each image forming unit 100 includes a charger 7, a developing unit 9, and a photoreceptor cleaner 10 disposed around a photoreceptor drum 6. The image forming units 100Y, 100M, 100C, and 100K share the exposure unit 8. In the image forming unit 100Y, while the photoreceptor drum 6Y rotates in a direction indicated by an arrow shown in FIG. 1, a surface thereof is uniformly charged by the charger 7Y and then scanned with a laser light (optical beam) 11Y by the exposure unit 8 according to image information for an yellow image, forming an electrostatic latent image thereon.

It is to be noted that multiple beams can be used for each color so as to write image information for multiple lines at once.

Subsequently, the developing unit 9Y develops the electrostatic latent image, forming a yellow toner image on the photoreceptor drum 6Y. Then, the transfer unit 12Y transfers the toner image from the photoreceptor drum 6Y onto the transfer sheet 1 at a transfer position where the photoreceptor drum 6Y contacts the transfer sheet 1 on the transport belt 2.

After the toner image is thus transferred from the photoreceptor drum 6Y, the photoreceptor cleaner 10Y removes any toner remaining on the surface thereof, and thus the photoreceptor drum 6Y is prepared for a subsequent image formation.

The transfer sheet 1 on which the yellow toner image is formed is then transported to the magenta image forming unit 100M. In the image forming unit 100M, a magenta toner image is formed through processes similar to the processes described above, and the magenta toner image is transferred from the photoreceptor drum 6M and superimposed on the yellow toner image on the transfer sheet 1.

The transfer sheet 1 is further transported to the image forming units 100C and 100K, where cyan and black toner images are respectively formed. The cyan and black toner images are similarly superimposed on the transfer sheet 1, forming a multicolor image thereon.

It is to be noted that in the tandem image forming apparatus described above, image forming timings of the respective color images differ in a sub-scanning direction, that is, the sheet transport direction, for a time period corresponding to intervals between the photoreceptor drums 6 in order to superimpose the four color images one on another on an identical position of the transfer sheet 1. More specifically, writing of image formation for respective colors starts in the arrangement order of the photoreceptor drums 6Y, 6M, 6C, and 6K in the sheet transport direction.

After the multicolor image consisting of the four color toners is formed on the transfer sheet 1, the transfer sheet 1 leaves the transport belt 2 for the fixer 13. After the fixer 13 fixes the image thereon with heat and pressure, the transfer sheet 1 is discharged from the image forming apparatus.

The sensors 14 through 16 are arranged in a main scanning direction, that is, a width direction of the transport belt 2, above the transport belt 2 and detect positioning pattern (marks) formed on the transport belt 2. The image forming apparatus calculates deviations (skew, positional deviations in main scanning and sub-scanning directions, deviations in magnifications in the main scanning and sub-scanning directions, etc.) of the respective colors from a reference color based on results obtained by detecting the positioning pattern. Then, the positions of the images are adjusted based on the calculated deviations.

The cleaning unit 18 cleans a surface of the transport belt 2.

Figure 2:
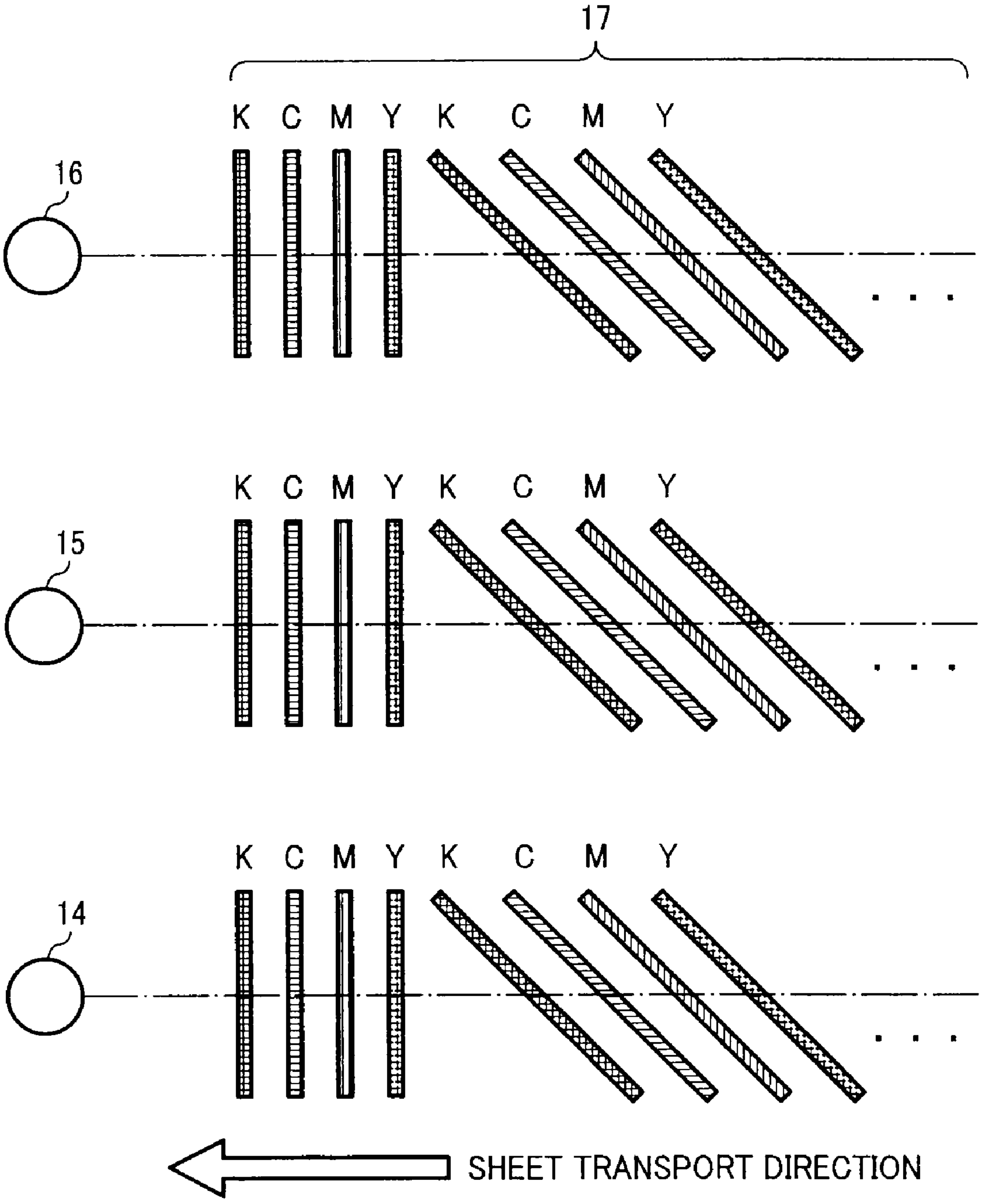
FIG. 2 partly illustrates positioning mark lines formed on a transport belt.

FIG. 2 partially illustrates lines of the positioning marks (hereinafter "positioning mark lines") 17 formed on the transport belt 2.

Referring to FIG. 2, multiple mark groups are formed as the positioning pattern. In each mark group, four color lines extending in the main scanning direction and four color lines oblique thereto are arranged in the sheet transport direction. In the present embodiments, eight mark groups are formed in each positioning mark line 17 as an example. These mark groups are detected by the sensors 14 through 16, and a mean value of results of the detection is calculated. The positions of the images are adjusted by an adjustment amount that is determined based on the mean value so as to produce high quality images with less color deviation.

More specifically, skew, positional deviations in the main scanning and sub-scanning directions, and deviations in magnifications in the main scanning and sub-scanning directions of the respective color from the reference color that in the present embodiment is black can be measured by detecting the multiple mark groups using the sensors 14 through 16 arranged in the main scanning direction. The positional deviations can be corrected in a shorter time period by setting a reference color and correcting positional deviations relative to the reference color.

Then, exposure conditions are changed so as to correct the positional deviations of the images. This positioning processing is hereinafter referred to as the positioning processing including positioning mark detection. Calculation of various deviations and adjustment amounts, and adjustment thereof, are initiated by a CPU (Central Processing Unit) 33 shown in FIG. 6.

After the sensors 14 through 16 detect the positioning pattern, the cleaning unit 18 that in the present embodiment is a cleaning blade removes the positioning pattern from the transport belt 2. It is to be noted that the cleaning unit 18 is not limited to the cleaning blade, and alternatively, the cleaning unit 18 can be a cleaning brush.

The exposure unit 8 is described below in further detail with reference to FIG. 3.

Figure 3:
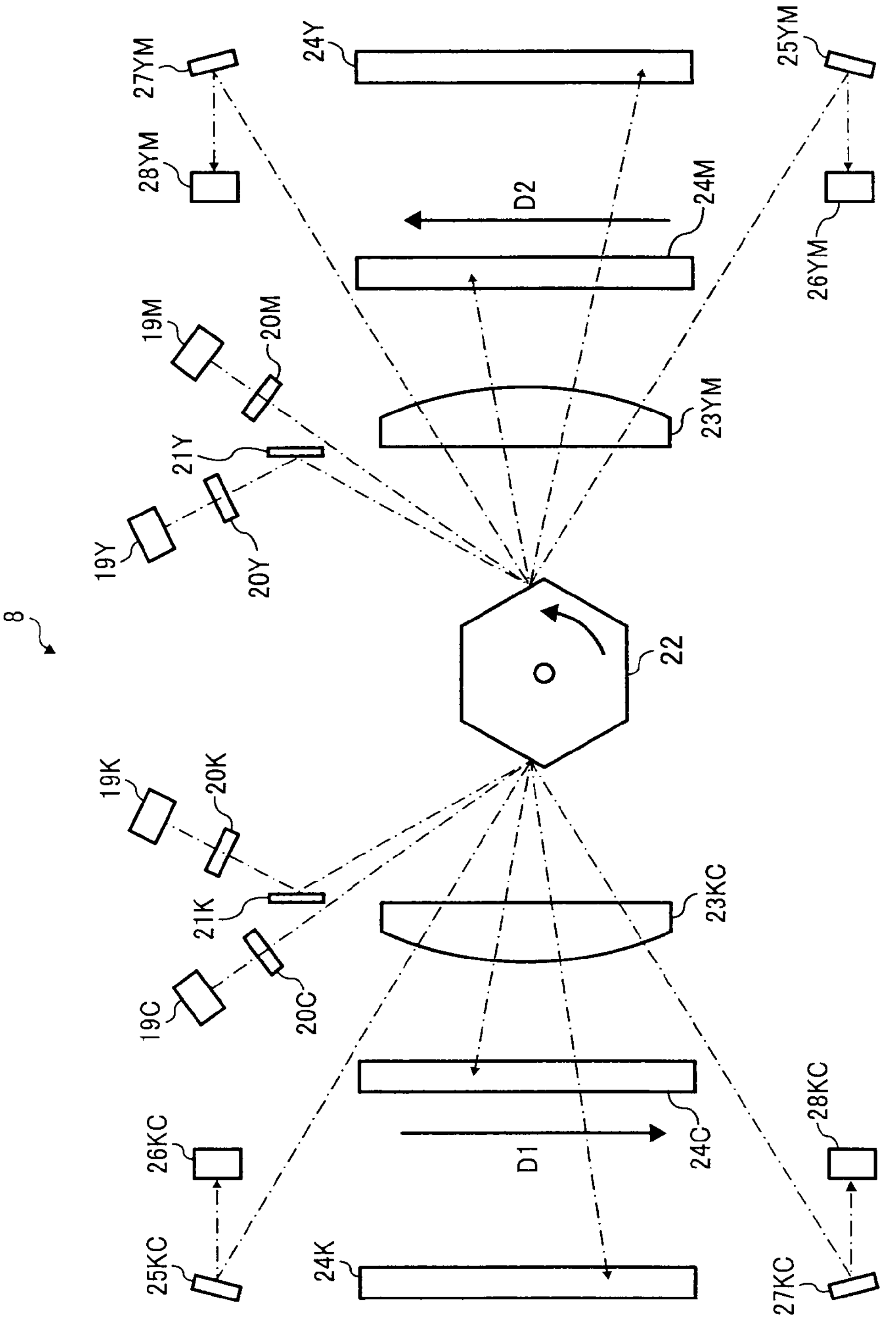
FIG. 3 is a plan view illustrating an exposure unit.

FIG. 3 is a plan view illustrating an example of arrangement of components included in the exposure unit 8.

As shown in FIG. 3, the exposure unit 8 includes LD (Laser Diode) units 19K, 19C, 19M, and 19Y for emitting laser beams; cylinder lenses 20K, 20C, 20M, and 20Y; reflecting mirrors 21K and 21Y; a polygon mirror 22; f-theta (θ) lenses 23KC and 23YM; first mirrors 24K, 24C, 24M, and 24Y; cylinder lenses 25KC and 25YM; sensors 26KC and 26YM including a light-receiving element (first beam detecting element) such as a PD (Photo Diode); cylinder mirrors 27KC and 27YM; and sub-scanning position sensors 28KC and 28YM that serve positional data detector and include two light-receiving elements.

Although not viewable from the plan view presented in FIG. 3, the polygon mirror 22 includes two regular-polygon columns, upper and lower, stacked one on top of the other and connected vertically, which deflect the laser beams as they rotate.

It is to be noted that components indicated by reference characters KC and YM are respectively shared by the optical beams for two colors, black and cyan, and yellow and magenta, and hereinafter the reference characters KC and YM may be omitted when color discrimination is not necessary.

In FIG. 3, optical beams (laser beam) emitted from the LD units 19K and 19Y respectively pass the cylinder lenses 20K and 20Y and are reflected by the reflecting mirrors 21K and 21Y onto a surface of the lower column of the polygon mirror 22. As the polygon mirror 22 rotates, the optical beams are deflected, pass through the fθ lenses 23KC and 23YM, and are then reflected by the first mirrors 24K and 24Y, respectively.

By contrast, optical beams emitted from the LD units 19C and 19M respectively pass the cylinder lenses 20C and 20M and reach a surface of the upper column of the polygon mirror 22. As the polygon mirror 22 rotates, the optical beams are deflected, pass through the fθ lenses 23KC and 23YM, and are then reflected by the first mirrors 24C and 24M, respectively.

The cylinder mirrors 25KC and 25YM and the sensors 26KC and 26YM are disposed in upstream portions that are upstream from writing start positions in the main scanning directions indicated by arrows D1 and D2, in each of which a track of the optical beam scanning the photoreceptor drum 6 (hereinafter "scanning line" or "scanning track") is formed. The optical beams that have passed the fθ lenses 23KC and 23YM are reflected by the cylinder mirrors 25KC and 25YM and focused on the sensors 26KC and 26YM, respectively. The sensors 26KC and 26YM are synchronous detection sensors that detect synchronism in the main scanning directions.

In downstream portions that are downstream from an image area, the cylinder mirrors 27KC and 27YM and the sub-scanning position sensors 28KC and 28YM are disposed similarly to the upstream portions. The optical beams that have passed the fθ lenses 23KC and 23YM are reflected by the cylinder mirrors 27KC and 27YM and focused on the sub-scanning position sensors 28KC and 28YM, respectively.

The optical beams for black and cyan (hereinafter "black and cyan optical beams") emitted from the LD units 19K and 19C share the cylinder mirror 25KC and the sensor 26KC on a writing start side, and the cylinder mirror 27KC and the sub-scanning position sensor 28KC on a writing end side on the left in FIG. 3. Similarly, the optical beams for yellow and magenta (hereinafter "yellow and magenta optical beams") emitted from the LD units 19Y and 19M share the cylinder mirror 25YM and the sensor 26YM on a writing start side, and the cylinder mirror 27YM and the sub-scanning position sensor 28YM on a writing end side on the right in FIG. 3.

Because the optical beams for two different colors (black and cyan or yellow and magenta) enter an identical sensor (sensor 26KC, 26YM, 28KC, or 28YM) as described above, the exposure unit 8 is configured to cause the two optical beams to enter the sensor at different timings by directing the two optical beams at different incident angles onto the polygon mirror 22. Thus, the sensors 26KC, 26YM, 28KC, and 28YM can output pulse trains chronologically.

As shown in FIG. 3, the black and cyan optical beams, and the yellow and magenta optical beams, scan in opposite directions. Each optical beam pass two sensors, the sensors 26 and 28, and a time period required for the optical beam to travel between the two sensors is measured by counting pixel clocks and the like.

Then, writing frequency is adjusted so that the counted value matches a predetermined or reference count value, and thus the magnification is adjusted. This method is hereinafter referred to as magnification adjustment through a two-point synchronism method.

If the magnification is adjusted through the above-described positioning processing including positioning mark detection, it takes a relatively long time, and thus it is not preferred to perform such an adjustment method frequently. In continuous printing, the magnification might change sharply due to an increase in temperature of the components of the exposure unit 8, particularly the fθ lenses 23KC and 23YM. Therefore, it is necessary to adjust the magnification in a shorter time period through the two-point synchronism method described above. In particular, when the fθ lenses 23KC and 23YM are made of plastic and the like, the temperature can rise sharply.

For the reason described above, the two-point synchronism method is used to adjusted the magnification in the present embodiment as well as the positioning processing including positioning mark detection.

The sub-scanning position sensors 28KC and 28YM disposed on the writing end sides in the main scanning directions indicated by arrows D1 and D2, respectively, are described below in further detail with reference to FIG. 4.

Figure 4:
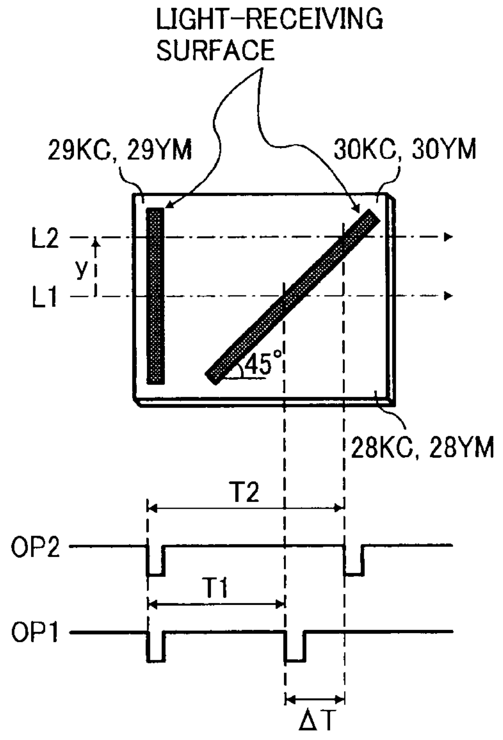
FIG. 4 illustrates a synchronous position sensor and outputs therefrom.

In FIG. 4, reference characters L1 and L2 respectively represent scanning lines, and OP1 and OP2 respectively represent outputs from the sub-scanning position sensor 28KC or 28YM. Each sub-scanning position sensors 28 includes light-receiving elements 29 and 30 respectively serving as second and third beam detecting elements. The light-receiving element 29 is perpendicular or substantially perpendicular to the scanning line, that is, in the main scanning direction indicated by arrow D1 or D2 in FIG. 3. The light-receiving element 30 is disposed at an angle of 45 degrees, for example, to the light-receiving element 29. The light-receiving elements 29 and 30 output a signal when light-receiving surfaces thereof receive the optical beam, and the sub-scanning position sensors 28 detects a time period for the optical beam to travel between the light-receiving elements 29 and 30 as positional data in the sub-scanning direction.

Now, calculation of positional deviations in the sub-scanning direction is described below with reference to FIG. 4.

For example, so long as there is no positional deviation in the sub-scanning direction on the transfer sheet, the scanning line L1 passes the sub-scanning position sensor 28, and a time period from when the light-receiving element 29 outputs a signal to when the light-receiving element 30 outputs a signal (hereinafter "optical beam travel time") is a time period T1.

When a positional deviation in the sub-scanning direction is caused by changes in temperature, the scanning line L1 shifts to the scanning line L2, and accordingly, the optical beam travel time shifts from the time period T1 to a time period T2. In this case, a positional change amount (deviation) can be obtained by the following formula using a difference ΔT between the time periods T1 and T2:

$$y = V \times \Delta T \times \tan 45° = V \times \Delta T \qquad 1$$

wherein y represents the positional change amount in the sub-scanning direction in millimeters (mm), V represents a scanning velocity in the main scanning direction in millimeters per seconds (mm/s), and ΔT represents the difference between the time periods T1 and T2 (positional deviation) in seconds.

An adjustment amount L, that is, the number of lines in the sub-scanning direction can be calculated by the following formula:

$$L = y/LS \qquad 2$$

wherein LS represents line size in millimeters.

Then, the position of the image is adjusted by the adjustment amount L obtained through formula 2 based on the positional change amount y calculated through formula 1 by changing the exposure conditions, such as exposure timing and the like.

Another example of the arrangement of the synchronous detection sensor in the sub-scanning direction is described below with reference to FIG. 5.

Figure 5:
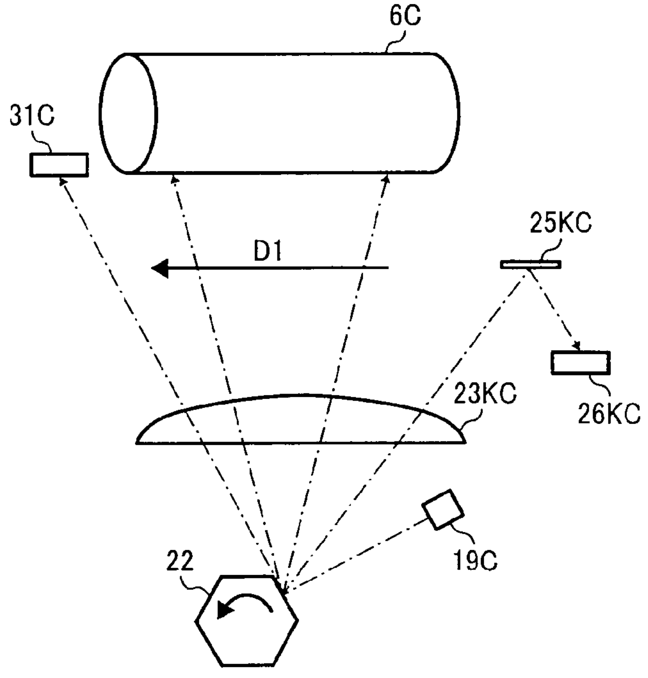
FIG. 5 illustrates an example of arrangement of the synchronous detection sensor.

FIG. 5 illustrates an example in which the synchronous detection sensor in the sub-scanning direction is disposed outside the exposure unit 8.

It is to be noted that FIG. 5 illustrates a case of the synchronous detection sensor for cyan, and the cyan optical beam scans the surface of the photoreceptor drum 6C in the direction indicated by arrow D1.

In the example shown in FIG. 5, instead of the sub-scanning position sensor 28KC disposed inside the exposure unit 8, a sub-scanning position sensor 31C is disposed relatively close to the photoreceptor drum 6C. In this case, the positional deviation in the sub-scanning direction can be calculated using formulas 1 and 2 shown above similarly to the example shown in FIG. 3. Because the sensor 31C is closer to the photoreceptor drum 6C, the example shown in FIG. 5 can detect the positional deviation in the sub-scanning direction more accurately than the example shown in FIG. 3.

The sensors for detecting the optical beams according to the present embodiment are described below in further detail.

Figure 6:
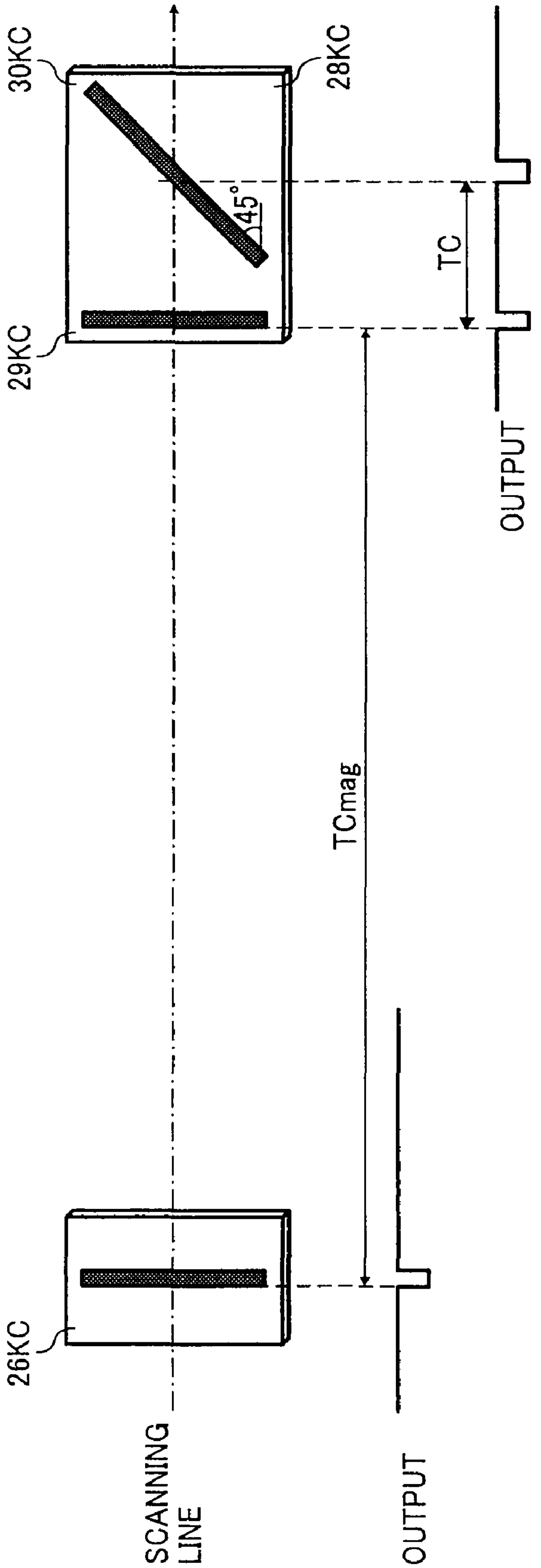
FIG. 6 illustrates an example of arrangement of sensors for detecting an optical beam.

FIG. 6 illustrates an example of arrangement of the light-receiving elements (beam detecting elements) of the sensors 26 and the sub-scanning position sensors 28, and detection outputs therefrom.

Each sensor 26 includes one light-receiving element (first beam detecting element), and each sub-scanning position sensor 28 includes two light-receiving elements, the light-receiving elements 29 and 30 (second and third beam detecting elements), as described above. The light-receiving element of the sensor 26 and those of the each sub-scanning position sensor 28 are arranged on an identical scanning line (main scanning direction).

Thus, in the present embodiment, each optical beam is detected by three beam detecting elements arranged on an identical scanning line. That is, the black and cyan optical beams are detected by the sensor 26KC and the light-receiving elements 29KC and 30KC, and the yellow and magenta optical beams are detected by the sensor 26YM and the light-receiving elements 29YM and 30YM. It is to be noted that, although FIG. 6 illustrates the example of the arrangement for cyan, the arrangement for other colors are similar thereto.

As shown in FIG. 6, the sensor 26KC located on the upstream portion, the light-receiving element 29KC, and the light-receiving element 30KC output signals sequentially as the light-receiving surface thereof receives the optical beam being running in the main scanning direction in that order. Overall magnification of the image is then adjusted based on a signal interval Tcmag between signals output from the sensor 26KC and the light-receiving element 29KC, that is, the travel time of the optical beam to travel between the sensor 26KC and the light-receiving element 29KC. The position in the sub-scanning direction is adjusted based on a signal interval TC between signals output from the light-receiving elements 29KC and 30KC, that is, the travel time of the optical beam to travel between the light-receiving element 29KC and the light-receiving element 30KC.

A control circuit of the image forming apparatus shown in FIG. 1 according to the present embodiment is described below with reference to FIG. 7.

Figure 7:
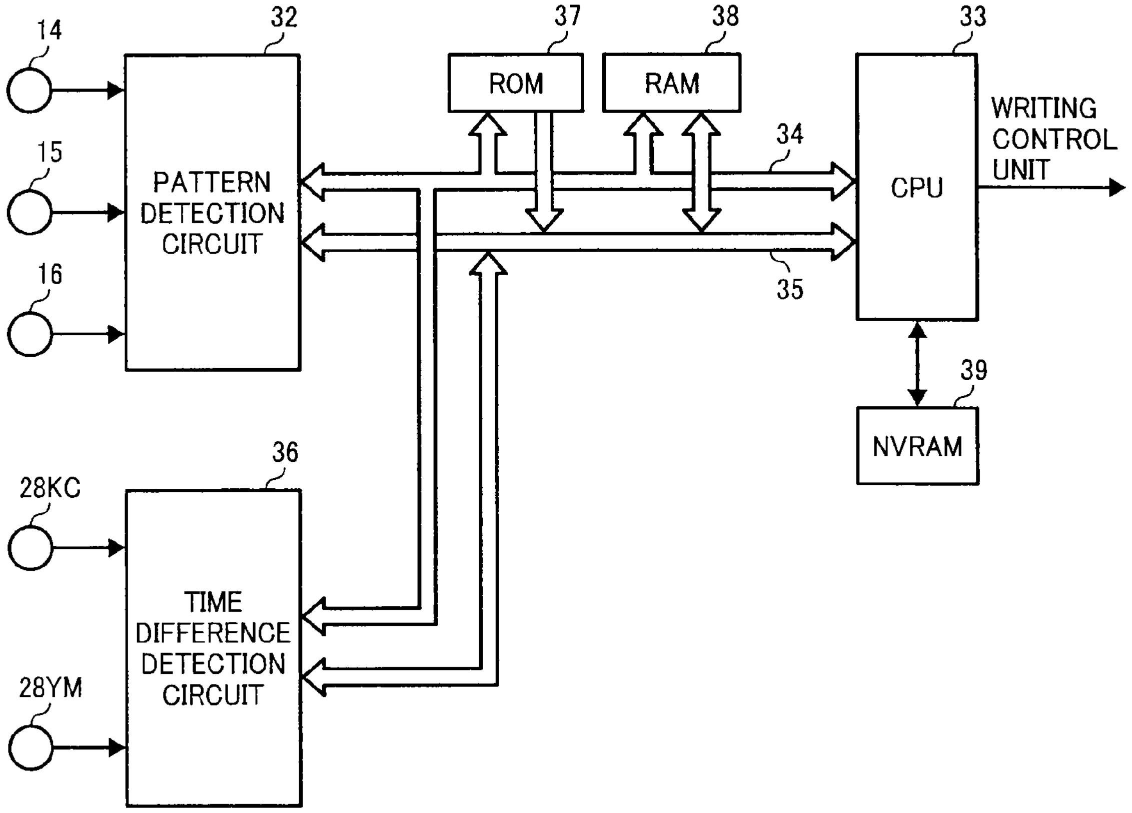
FIG. 7 is a block diagram illustrating a configuration of a control circuit.

FIG. 7 is a block diagram illustrating the control circuit serving as an adjustment unit.

Referring to FIG. 7, the control circuit according to the present embodiment includes a pattern detection circuit 32, the CPU 33, a time difference detection circuit 36 for detecting differences in the optical beam travel times, a ROM (Read-Only Memory) 37, a RAM (Random Access Memory) 38, and an NVRAM (Non-Volatile RAM) 39. The RAM 38 and the NVRAM 39 serve as storage units. Signals from the sensors 14 through 16 that detect the positioning mark lines 17 are input to the pattern detection circuit 32. The pattern detection circuit 32 is connected to the CPU 33 via an address bus 34 and a data bus 35. The CPU 33 reads out results of the detection from the pattern detection circuit 32, calculates various deviations and adjustment amounts therefor, and then sets adjustment data used by a writing controller, not shown, in order to adjust the exposure timing.

Additionally, the sub-scanning position sensors 28KC and 28YM are connected to the time difference detection circuit 36 and detect the time period required for the optical beams to travel between the light-receiving element 29 and the light-receiving element 30. Although not shown in FIG. 7, the sensor 26 can be connected to the time difference detection circuit 36. The ROM 37 and the RAM 38 are connected to both the address bus 34 and the data bus 35. The ROM 37 stores program codes for executing the processing performed in the present embodiment and other various image forming processing. The CPU 33 expands the program codes in the RAM 39, tentatively stores CPU data, and executes control processes defined by the program codes using data stored in the RAM 38. The NVRAM 39 is connected to the CPU 33 and stores various data regarding the image forming apparatus.

Detection of the optical beam travel time (positional data in the sub-scanning direction) by the sub-scanning position sensors 28KC and 28YM is described below.

Figure 8:
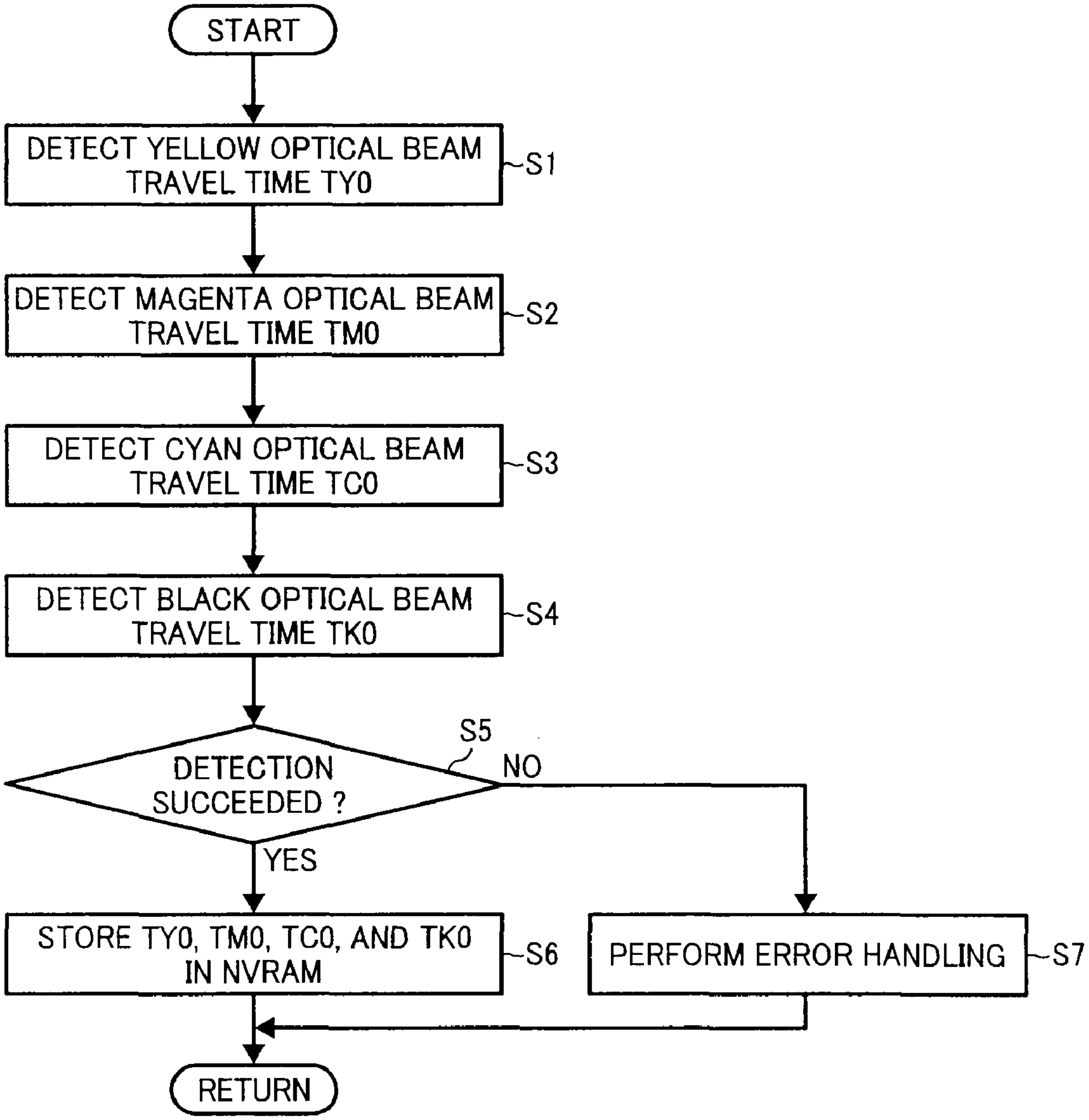
FIG. 8 is a flowchart illustrating a calibration procedure of reference data for positional data in a subscanning direction.

FIG. 8 is a flowchart illustrating a travel time calibration procedure, which is performed in an initial state without positional deviations or each time the positional deviations are corrected.

In this processing, at S1 the sub-scanning position sensor 28YM detects a time period required for the yellow optical beam to travel between the light-receiving elements 29YM and 30YM shown in FIG. 4 (hereinafter "travel time calibration value TY0") and, at S2, detects a time period required for the magenta optical beam to travel therebetween (hereinafter "travel time calibration value TM0").

At S3 the sub-scanning position sensor 28KC detects a time period required for the cyan optical beam to travel between the light-receiving elements 29KC and 30KC (hereinafter "travel time calibration value TC0") and, at S4, detects a time period required for the black optical beam to travel therebetween (hereinafter "travel time calibration value TK0").

The travel time calibration values TY0, TM0, TC0, and TK0 serve as reference data for the positional data in the sub-scanning direction of the optical beam.

After the four optical beams are detected, at S5 the control circuit determines whether or not all optical beams have been successfully detected. When all optical beams have been successfully detected (YES at S5), at S6 the control circuit stores the travel time calibration values TY0, TM0, TC0, and TK0 in the NVRAM 39 and then returns to S1.

By contrast, when detection of at least one optical beam has failed (NO at S5), at S7 the control circuit regards it as an error and performs a predetermined or given process as error handling. For example, the control circuit can simply keep previously stored travel time calibration values of the four optical beams and not store the newly detected travel times TY0, TM0, TC0, and TK0 in the NVRAM 39. Alternatively, the control circuit can cause a control panel to display an error message and/or inhibit image formation. Then, the process returns to S1.

Next, correction of the positional deviations is described below.

Figure 9A:
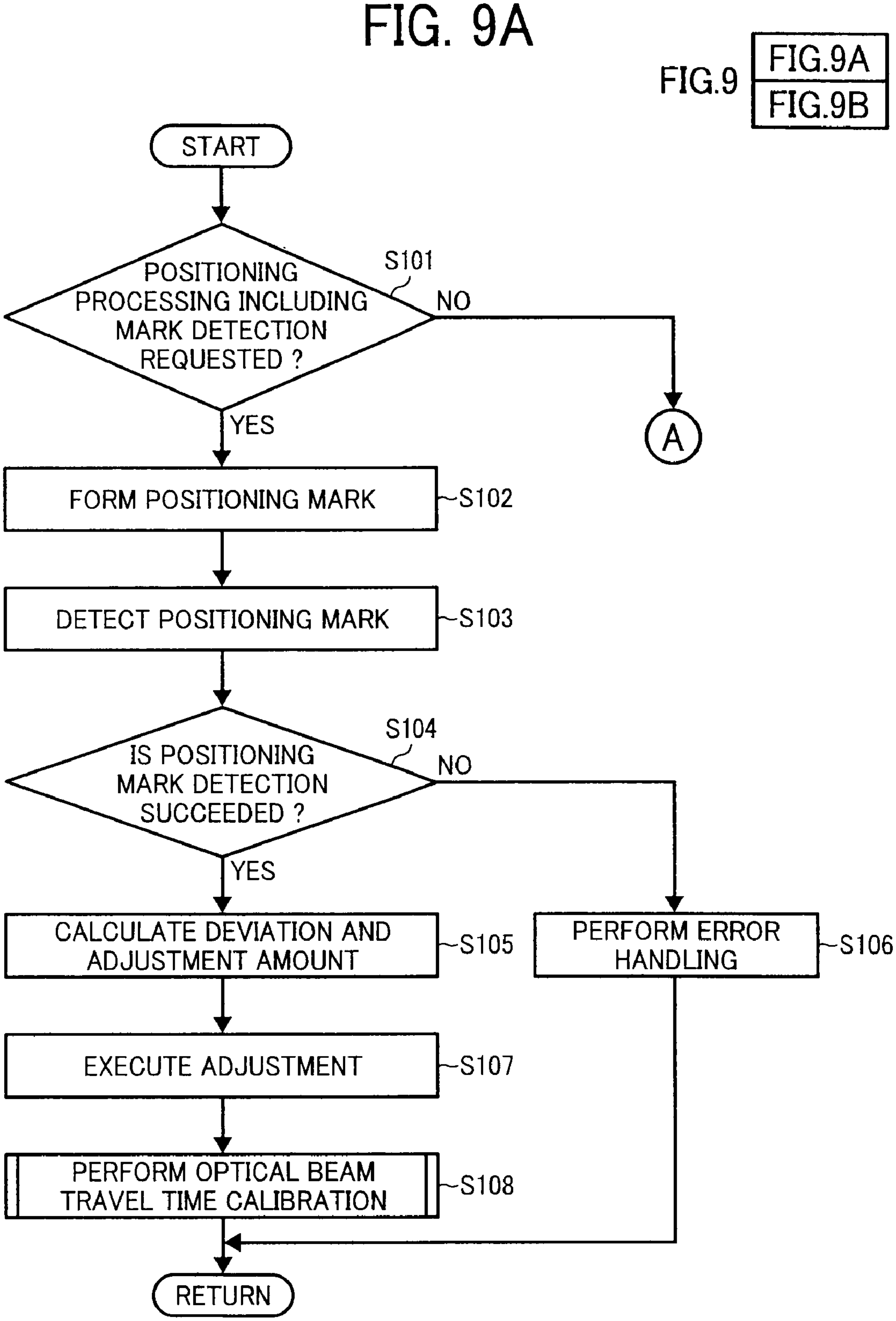
FIG. 9 is a flowchart illustrating positioning processing according to the present embodiment.
Figure 9B:
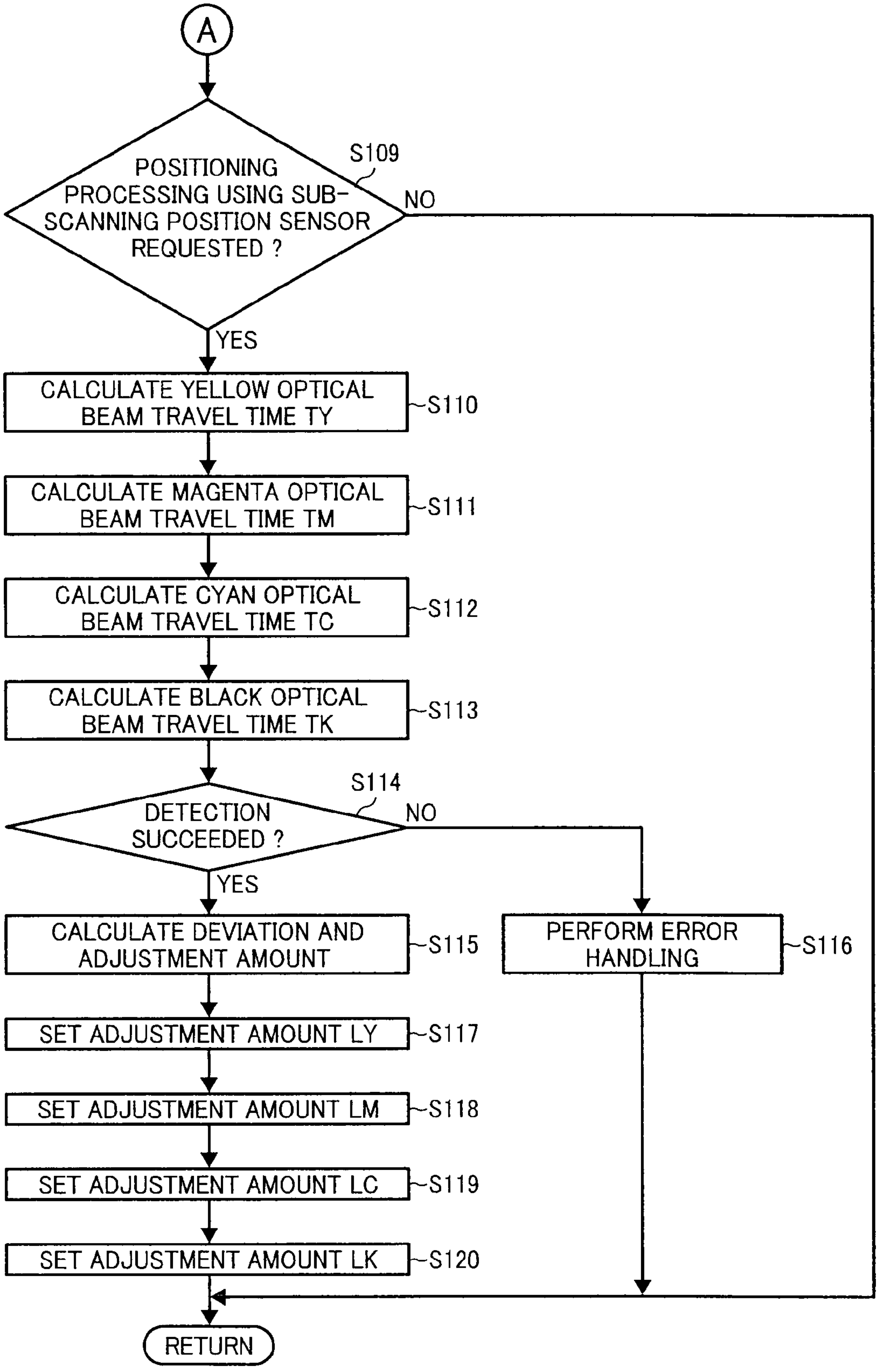

FIG. 9 is a flowchart illustrating correction of the positional deviations according to the present embodiment.

Referring to FIG. 9, at S101 the control circuit checks whether or not the positioning processing including positioning mark detection has been requested. When that positioning processing has been requested (YES at S101), at S102 the control circuit instructs the image forming units 100 shown in FIG. 1 to form the positioning mark lines 17 shown in FIG. 2 on the transport belt 2 shown in FIG. 1.

At S103 the sensors 14 through 16 detect the positioning mark lines 17, and at S104 the control circuit determines whether or not the positioning mark lines 17 have been successfully detected.

When the positioning mark detection is successful (YES at S104), at S105 the control circuit calculates the deviations and the adjustment amounts therefor based on results of the detection.

By contrast, when the positioning mark detection is not successful (NO at S104), at S106 the control circuit performs a predetermined or given process as error handling. For example, the control circuit can simply keep current exposure conditions. Alternatively, the control circuit can cause the control panel to display an error message and/or inhibit image formation. Then, the process returns to S101.

After the adjustment amounts are calculated at S105, at S107 the control circuit sets the adjustment amounts in the writing control unit, not shown, thus correcting the positional deviations. At S108 the control circuit causes the sub-scanning position sensor 28 shown in FIG. 4 to detect the travel time calibration values of the optical beams shown in FIG. 7 and then returns to S101.

By contrast, when the positioning processing including positioning mark detection has not been requested (NO at S101), at S109 the control circuit checks whether or not the positioning processing using the sub-scanning position sensors 28 has been requested. When this positioning processing has not been requested (NO at S109), the control circuit returns to S101. When this positioning processing has been requested (YES at S109), the control circuit performs the detection of the optical beam travel times.

More specifically, at S110 the sub-scanning position sensor YM detects a travel time of the yellow optical beam (hereinafter "travel time TY") and, at S111, detects a travel time of the magenta optical beam (hereinafter "travel time TM"). At S112 the sub-scanning position sensor KC detects a travel time of the cyan optical beam (hereinafter "travel time TC") and, at S113, detects a travel time of the black optical beam (hereinafter "travel time TK").

After the travel times of all optical beams are detected, at S114 the control circuit checks whether or not all optical beams have been successfully detected. When all optical beams have been successfully detected (YES at S114), at S115 the control circuit calculates the positional change amount y and the adjustment amounts L therefor through formulas 1 and 2 shown above. By contrast, when detection of at least one optical beam is not successful (NO at S114), at S116 the control circuit performs the above-described predetermined error handing, and the processing then returns to S101.

After the positional change amounts y and the adjustment amounts L are calculated at S115, adjustment amounts L for respective colors are set in the writing control unit. It is to be noted that the adjustment amounts L can be set during a time period corresponding to a non-image area between sheets (pages) output during continuous image formation.

The control circuit sets an adjustment amount LY for yellow at S117 and sets an adjustment amount LM for magenta at S118. Further, the control circuit sets an adjustment amount LC for cyan at S119 and sets an adjustment amount LK for black at S120. Then, the processing returns to S101.

It is to be noted that, although the travel time calibration values TY0, TM0, TC0, and TK0 are stored in the NVRAM 39 as described above, the travel times TY, TM, TC, and TK are stored in the RAM 38 because it is not necessary to keep the travel times TY, TM, TC, and TK after the adjustment amounts are calculated. By storing the travel time calibration values TY0, TM0, TC0, and TK0 in the NVRAM 39, which can retain its contents even when power is turned off and then turned on again, it is not necessary to detect the travel time calibration values TY0, TM0, TC0, and TK0 each time power is turned on. Thus, detection of the travel time calibration values TY, TM, TC, and TK can be omitted when power is turned on, reducing downtime.

Figure 10:
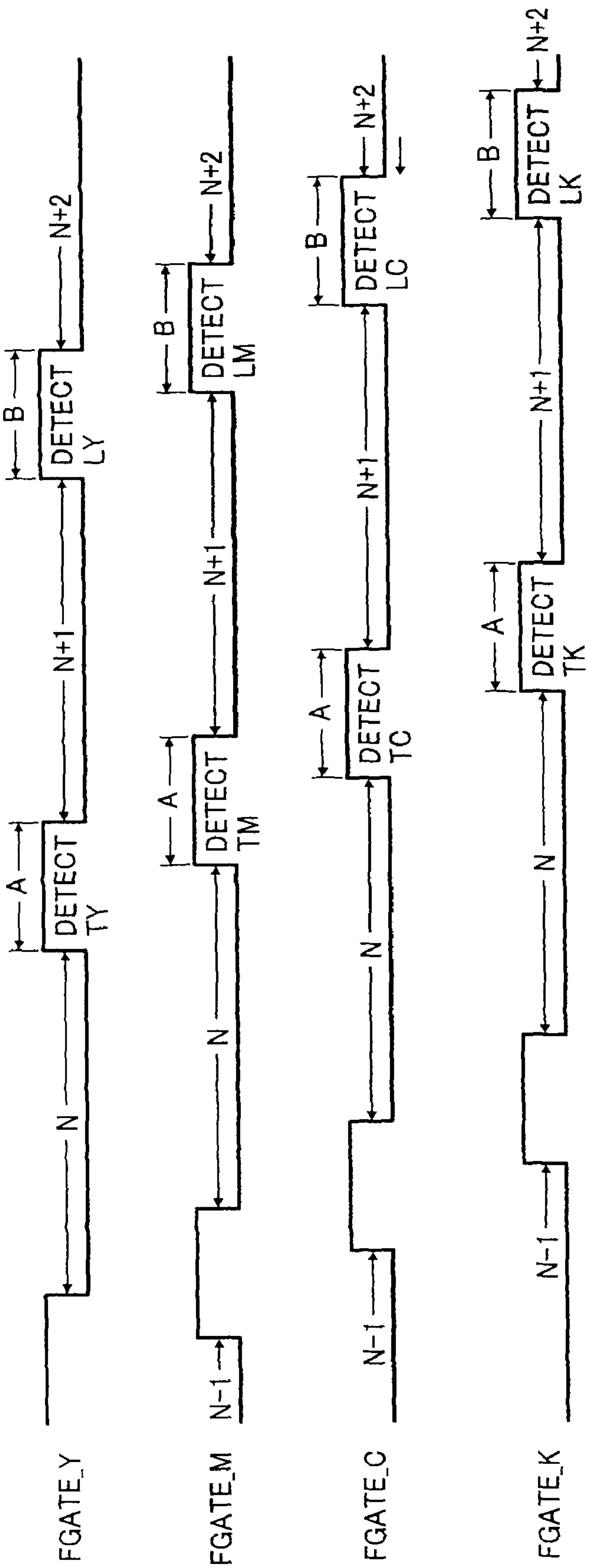
FIG. 10 is a timing chart illustrating an example of timings of image formation, detection of positional deviations, and adjustment thereof for respective colors.

FIG. 10 is a timing chart illustrating an example of timings of image formation, detection of the positional deviations, and positioning for respective colors.

In FIG. 10, reference characters FGATE_Y, FGATE_M, FGATE_C, and FGATE_K respectively represent sub-scanning image area signals for respective colors; A and B represent non-imaging time periods; IL represents a image-forming time period; and N represents a given serial number of transfer sheets (pages) output during continuous image formation corresponding to image-forming time periods.

It is to be noted that, although a given image-forming time period and a given non-imaging time period differ among the respective colors for the time period corresponding to intervals between the photoreceptor drums 6 as described above, they correspond to an identical image area (page) and an identical non-image area, respectively, on the transport belt 2 shown in FIG. 1, In the example shown in FIG. 10, the positioning patterns of the respective colors are detected in the non-imaging time period A corresponding to a non-image area between the pages N and N+1. Then, the adjustment amounts are set in the writing control unit in the subsequent non-imaging time period B corresponding to the non-image area between the pages N+1 and N+2. Thus, on the page N+2, a multicolor image without positional deviation can be formed.

It is to be noted that, although the positioning patterns are detected between the pages N and N+1 (non-image area A) in the example shown in FIG. 10, the timing with which the positioning pattern are detected is not limited thereto. However, setting of the adjustment amounts in the writing control unit should be performed in an identical non-image area (non-image area B) between consecutive two sheets.

In the flowchart shown in FIG. 9, whether to perform positioning processing including positioning mark detection or that using the sub-scanning position sensors 28 can be determined using a predetermined or given threshold regarding the image forming conditions, such as the number of pages output during continuous image formation, temperature inside the image forming apparatus, and the like. Thus, the positional adjustment can be performed each time the number of output sheets reaches a predetermined or given number, operating time of the image forming apparatus reaches a predetermined or given time period, and the like, or when changes in temperature exceed a predetermined or given range.

For example, the control circuit can request the positioning processing including positioning mark detection when the number of output pages reaches a threshold or temperature inside the image forming apparatus exceeds a threshold, otherwise the control circuit can request the positioning processing using the sub-scanning position sensors 28. Alternatively, the control circuit can request the positioning processing including positioning mark detection when at least one of the currently detected travel times TY, TM, TC, and TK of the optical beams is outside of a permissible range of the travel time calibration value (TY0, TM0, TC0, or TK0) or when differences between the travel time calibration value and the current optical beam travel times exceed a predetermined value or range.

Thus, adverse effects such as changes in the positions of the sub-scanning position sensors 28 caused by an increase in temperature on the positional adjustment can be reduced, enhancing accuracy of the positional adjustment.

In other words, by combining the positioning processing including positioning mark detection and the positioning processing using the sub-scanning position sensors 28, accuracy of the positional adjustment can be maintained while reducing downtime.

It is to be noted that, although the respective colors are separately adjusted based on the travel time calibration values and the currently detected travel times in the above-described example, alternatively, one of the four colors, for example, black, can be set as a reference color. More specifically, when the reference color is black, the positional adjustment can be performed according to deviations of the travel times TY, TM, and TC relative to the yellow optical beam travel time TK, which can be calculated by respectively deducting the travel time TK from travel times TY, TM, and TC (TY-TK, TM-TK, and TC-TK).

Additionally, in the detection of the travel time calibration values TY0, TM0, TC0, and TK0 and the current travel times TY, TM, TC, and TK of the respective color optical beams, each optical beam is repeatedly measured for a predetermined or given number of times to obtain a mean value thereof, and the mean value is used so as to eliminate or reduce effects of noise. For example, when the polygon mirror 22 (shown in FIG. 3) has six faces, the number of times the travel time of each optical beam is measured can be a multiple of 6, for example, 18. Thus, errors in the detection can be reduced by using a mean value of multiple numbers of detections of the positional data.

Further, in the present embodiment, a process linear velocity is changed depending on the thickness of the transfer sheet. When a transfer sheet is thicker than a standard transfer sheet, the process linear velocity can be, for example, half a process linear velocity S. In this case, rotational velocity of the polygon mirror 22 (shown in FIG. 3) is also half a standard rotational velocity, and accordingly, a scanning velocity in the main scanning direction is half a standard scanning velocity. Therefore, the adjustment amounts of the respective colors are determined by comparing the current optical beam travel times with values that are twice the travel time calibration values, respectively. In other words, when the process linear velocity (scanning velocity of the optical beam) is changed to a velocity that is $\alpha\times S$ ($\alpha>0$), the current optical beam travel times TY, TM, TC, and TK are compared with TY0/$\alpha$, TM0/$\alpha$, TC0/$\alpha$, and TK0/$\alpha$, respectively.

It is to be noted that when multiple beams are used for each color, for example, when each photoreceptor drum 6 is scanned with two laser beams, it is not necessary to detect both the laser beams separately. For example, only one beam preceding the other beam in the sub-scanning direction needs be detected. Thus, positional adjustment time can be reduced by correcting the positional deviations based on the reference data and the positional data of only one of the multiple beams.

As can be appreciated by those skilled in the art, although the description above concerns the direct transfer type tandem image forming apparatus, the above-described positional adjustment can be used in an intermediate transfer type tandem image forming apparatus including multiple image forming units arranged in a direction in which an intermediate transfer member such as an intermediate transfer belt transports transfer sheets. The intermediate transfer type tandem image forming apparatus superimposes respective single-color images formed in the multiple image forming units one on another on the intermediate transfer belt, forming a multi-color image thereon, and then transfers the multi-color image onto the transfer sheet. In this case, the intermediate transfer member serves as the transport member on which the positioning pattern is formed.

Additionally, the present invention is not limited to a belt type image forming apparatus but can be adopted in a multi-color image forming apparatus using a transfer drum, an intermediate transfer drum, an intermediate transfer roller, and the like. Although yellow, magenta, cyan, and black are used in the description above, the colors are not limited thereto. For example, the number of colors can be six.

As described above, according to the present embodiment, the sub-scanning position detectors detects reference data (TY0, TM0, TC0, and TK0) and the current positional data (TY, TM, TC and TK) in the subscanning direction of the optical beams. The reference data are stored, and the positional deviations are corrected based on the stored reference data. Thus, frequency of formation and detection of the positional marks, calculation of the positional deviations, and the adjustment thereof can be reduced while reducing occurrence of positional deviations. Because the positional marks are formed and detected less frequently, downtime as well as toner consumption can be reduced.

The positional deviations can be corrected efficiently by setting the positional adjustment to be performed at the predetermined timing that is each time the number of output sheets reaches a predetermined number, each time operating time of the image forming apparatus reaches a predetermined time period, or each time changes in temperature exceed a predetermined range.

Additionally, although the positions of the sub-scanning position sensors (positional data detectors) can change due to an increase in temperature, effects of the positional change of the sub-scanning position sensors can be reduced by performing the positioning processing including the positional mark detecting when differences between the current positional data and the reference data therefor exceed a predetermined permissible value or range.

The present invention can be embodied as a computer-readable recording medium storing a positional deviation correction program including program codes for executing the above-described various positional deviation correcting processing.

Numerous additional modifications and variations are possible in light of the above teachings. It is therefore to be understood that, within the scope of the appended claims, the disclosure of this patent specification may be practiced otherwise than as specifically described herein.

What is claimed is:

1. A multicolor image forming apparatus for forming a multicolor image on a sheet of recording media by superimposing different single-color images one on another, the multicolor image forming apparatus comprising:

an exposure unit to direct optical beams for optically writing the different single-color images on respective image carriers;

a pattern forming unit to form a positioning pattern on a transport member;

a pattern detector disposed above the transport member on a scanning line, to detect the positioning pattern;

a positional data detector to detect positional data in a sub-scanning direction of the optical beams;

an adjustment unit to detect positional deviations among the different single-color images based on detection results generated by the pattern detector and the positional data detector, respectively, and to correct the positional deviations; and a storage unit to store as reference data the positional data in the sub-scanning direction of the optical beams that is detected when the positional deviations are corrected, wherein:

the positional data detector detects current positional data in the sub-scanning direction of the optical beams at a predetermined timing before a subsequent positioning pattern is formed, the adjustment unit corrects the positional deviations based on the reference data and the current positional data in the sub-scanning direction of the optical beam, and when a scanning velocity of the optical beams is multiplied by $\alpha$ that is greater than 0, the reference data is divided by $\alpha$.

2. The multicolor image forming apparatus according to claim 1, wherein the predetermined timing is one of when a number of output sheets reaches a predetermined number, when an operating time of the multicolor image forming apparatus reaches a predetermined time period, and when a change in temperature exceeds a predetermined range.

3. The multicolor image forming apparatus according to claim 1, wherein the pattern detector and the positional data detector respectively detect the positioning pattern and the positional data for each color, and the adjustment unit corrects the positional deviations for each color.

4. The multicolor image forming apparatus according to claim 3, wherein the adjustment unit corrects the positional deviations of respective colors during non-imaging time periods corresponding to a non-image area between consecutive sheets transported on the transport member.

5. The multicolor image forming apparatus according to claim 1, wherein one of the respective colors is used as a reference color, and the adjustment unit corrects the positional deviations among the single-color images by correcting positional deviations relative to the reference color based on the current positional data of the respective optical beams.

6. The multicolor image forming apparatus according to claim 5, wherein the adjustment unit corrects the positional deviations during non-imaging time periods corresponding to a non-image area between consecutive sheets transported on the transport member.

7. The multicolor image forming apparatus according to claim 1, wherein the positional data in the sub-scanning direction of each of the optical beams is a mean value obtained from repeated detections of the optical beam.

8. The multicolor image forming apparatus according to claim 1, wherein, when multiple optical beams are used for writing each single-color image, the adjustment unit adjusts the positional deviations of each of the different single-color images based on the reference data and the current positional data in the subscanning direction of only one of the multiple beams.

9. The multicolor image forming apparatus according to claim 1, wherein the storage unit stores the current positional data as well as the reference data.

10. The multicolor image forming apparatus according to claim 1, wherein, when a difference between the reference data and the current positional data exceeds a predetermined value, the pattern forming unit forms the positioning pattern, the pattern detector detects the positioning pattern, and the adjustment unit corrects the positional deviations that is calculated based on results generated by the pattern detector.

11. The multicolor image forming apparatus according to claim 1, further comprising an optical beam detector, wherein the positional data detector and the optical beam detector are disposed on an identical scanning line, and the adjustment unit adjusts magnification in a main scanning direction based on results generated by both the positional data detector and the optical beam detector.

12. A multicolor image forming apparatus for forming a multicolor image on a sheet of recording media by superimposing different single-color images one on another, the multicolor image forming apparatus comprising:

an exposure unit to direct optical beams for optically writing the different single-color images on respective image carriers;

a pattern forming unit to form a positioning pattern on a transport member;

a pattern detector disposed above the transport member on a scanning line, to detect the positioning pattern;

a positional data detector to detect positional data in a sub-scanning direction of the optical beams;

an adjustment unit to detect positional deviations among the different single-color images based on detection results generated by the pattern detector and the positional data detector, respectively, and to correct the positional deviations; and a storage unit to store as reference data the positional data in the sub-scanning direction of the optical beams that is detected when the positional deviations are corrected, wherein:

the positional data detector detects current positional data in the sub-scanning direction of the optical beams at a predetermined timing before a subsequent positioning pattern is formed, and the adjustment unit corrects the positional deviations based on the reference data and the current positional data in the sub-scanning direction of the optical beam, the multicolor image forming apparatus further comprising an optical beam detector, wherein:

the positional data detector and the optical beam detector are disposed on an identical scanning line, the adjustment unit adjusts magnification in a main scanning direction based on results generated by both the positional data detector and the optical beam detector, the optical beam detector comprises a first beam detecting element that is a linear element extending perpendicularly to a scanning line, the positional data detector comprises a second beam detecting element that is a second linear element extending perpendicularly to the scanning line and a third beam detecting element that is oblique to the second beam detecting element, and the adjustment unit adjusts magnification in the main scanning direction based on a time period for the optical beam to travel between the first and second beam detecting elements, and adjusts a position of the single-color image in the sub-scanning direction based on a time period for the optical beam to travel between the second and third beam detecting elements.

13. A positional deviation correction method for a multicolor forming apparatus that forms a multicolor image by superimposing different single-color images one on another, the multicolor image forming apparatus comprising:

an exposure unit to direct optical beams for optically writing the different single-color images on image carriers, respectively; and a pattern forming unit, the positional deviation correction method comprising:

forming a positioning pattern on a transport member;

detecting the positioning pattern;

correcting positional deviations among the different single-color images based on results of the positioning pattern detection;

storing as reference data positional data in a sub-scanning direction of the optical beams that are detected when positions of the different single-color images are adjusted;

detecting current positional data in the sub-scanning direction of the optical beams;

detecting positional deviations among the different single-color images based on the detected current positional data in the sub-scanning direction of the optical beams and the stored reference data; and correcting the positional deviations by adjusting writing positions of the optical beams on the image carriers, wherein:

the current positional data in the sub-scanning direction of the optical beams is detected at a predetermined timing before a subsequent positioning pattern is formed, the positional deviations are corrected based on the reference data and the current positional data in the sub-scanning direction of the optical beam, and when a scanning velocity of the optical beams is multiplied by a that is greater than 0, the reference data is divided by $\alpha$.

14. The positional deviation correction method according to claim 13, wherein pattern detection and positional data detection are performed for each color, and the positional deviations are corrected for each color.

15. The positional deviation correction method according to claim 13, wherein one of the respective colors is used as a reference color, and the positional deviations among the single-color images are corrected by correcting positional deviations relative to the reference color based on the current positional data of the respective optical beams.

* * * * *